(12) United States Patent
Yang et al.

(10) Patent No.: US 10,061,942 B2
(45) Date of Patent: Aug. 28, 2018

(54) SECURE STORAGE OF AN ELECTRONIC SUBSCRIBER IDENTITY MODULE ON A WIRELESS COMMUNICATION DEVICE

(71) Applicant: Apple Inc., Cupertino, CA (US)

(72) Inventors: Xiangying Yang, Cupertino, CA (US); Li Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 447 days.

(21) Appl. No.: 14/724,789

(22) Filed: May 28, 2015

(65) Prior Publication Data

US 2015/0347786 A1 Dec. 3, 2015

Related U.S. Application Data

(60) Provisional application No. 62/005,185, filed on May 30, 2014.

(51) Int. Cl.
| | |
|---|---|
| *G06F 21/78* | (2013.01) |
| *G06F 12/14* | (2006.01) |
| *H04W 8/18* | (2009.01) |
| *H04W 8/20* | (2009.01) |
| *H04W 12/04* | (2009.01) |
| *H04W 12/08* | (2009.01) |

(52) U.S. Cl.
CPC .......... *G06F 21/78* (2013.01); *G06F 12/1408* (2013.01); *H04W 8/183* (2013.01); *H04W 8/205* (2013.01); *H04W 12/04* (2013.01); *G06F 2212/402* (2013.01); *H04W 12/08* (2013.01)

(58) Field of Classification Search
CPC ..... H04W 12/06; H04W 12/04; H04W 12/02; H04W 12/12; H04W 12/10; H04W 12/08; H04W 4/001; H04W 4/003; H04W 8/205; H04W 8/265; H04W 88/06; H04W 48/18; H04L 63/0853; H04L 63/0428; H04L 63/08; H04L 63/10; H04L 9/12
USPC .................. 455/411; 713/168, 150; 726/4, 5
See application file for complete search history.

(56) References Cited

U.S. PATENT DOCUMENTS

| 9,619,799 B2 | 4/2017 | Haggerty et al. |
| 2011/0252172 A1 | 10/2011 | Sun et al. |
| (Continued) | | |

FOREIGN PATENT DOCUMENTS

WO 2013036009 3/2013

OTHER PUBLICATIONS

PCT Application No. PCT/US2015/032828—International Search Report & Written Opinion dated Aug. 27, 2015.

(Continued)

*Primary Examiner* — Brian F Shaw
(74) *Attorney, Agent, or Firm* — Dickinson Wright RLLP

(57) ABSTRACT

A method for secure storage of an embedded Subscriber Identity Module (eSIM) on a wireless communication device including an embedded Universal Integrated Circuit Card (eUICC) and a memory external to the eUICC is provided. The method can include the eUICC determining that an eSIM package including an eSIM is to be stored on the memory. The method can also include the eUICC, in response to determining that the eSIM package is to be stored on the memory, maintaining a single-use session parameter associated with the eSIM package to enable installation of the eSIM on the eUICC if the eSIM package is later loaded onto the eUICC from the memory.

20 Claims, 7 Drawing Sheets

(56) References Cited

U.S. PATENT DOCUMENTS

| | | | |
|---|---|---|---|
| 2012/0117635 A1* | 5/2012 | Schell | G06F 21/34 |
| | | | 726/9 |
| 2012/0190354 A1 | 7/2012 | Merrien et al. | |
| 2012/0331292 A1* | 12/2012 | Haggerty | H04L 63/0272 |
| | | | 713/168 |
| 2013/0227646 A1 | 8/2013 | Haggerty et al. | |
| 2013/0294041 A1 | 11/2013 | Syal | |
| 2013/0303122 A1 | 11/2013 | Li et al. | |

OTHER PUBLICATIONS

"SIMalliance LTE UICC profile," simalliance, Jun. 23, 2013, 34 pages.
Taiwan Application No. 104117238—Office Action of the Intellectual Property Office, dated May 16, 2016.

\* cited by examiner

SECURE STORAGE OF AN ELECTRONIC SUBSCRIBER IDENTITY MODULE ON A WIRELESS COMMUNICATION DEVICE

CROSS-REFERENCE TO RELATED APPLICATIONS

The present application claims the benefit of U.S. Provisional Application No. 62/005,185, entitled "SECURE STORAGE OF AN EMBEDDED SUBSCRIBER IDENTITY MODULE ON A WIRELESS COMMUNICATION DEVICE" filed May 30, 2014, the content of which is incorporated herein by reference in its entirety for all purposes.

FIELD

The described embodiments relate generally to wireless communications technology. More particularly, the present embodiments relate to secure storage of an embedded Subscriber Identity Module (eSIM) on a wireless communication device.

BACKGROUND

Wireless communication devices, such as smart phones, have traditionally been configured to utilize Universal Integrated Circuit Cards (UICCs) that provide access to wireless network services. A UICC typically takes the form of a small removable card (e.g., a Subscriber Identity Module (SIM) card) that is inserted into a wireless communication device. In most cases, each UICC is associated with a single "Issuer"—such as a mobile network operator (MNO)—that controls the programming and distribution of the UICC.

In more recent implementations, non-removable UICCs—referred to herein as embedded UICCs (eUICCs)—are being included on system boards of wireless communication devices. These eUICCs are distinct from removable UICCs in that the eUICCs are non-removable and permanently affixed to circuit boards in wireless communication devices. An eUICC can be programmed with one or more eSIMs, each of which can emulate and replicate the architecture of a typical SIM so as to enable a wireless communication device that includes the eUICC to access wireless network services.

The use of eUICCs and eSIMs can offer significant advantages over traditional UICCs. For example the use of an eUICC can provide device manufacturers with increased flexibility in device design due to the lack of a requirement to design the device to accommodate the size and form factor of a removable UICC. As a further example, the ability to remotely provision (e.g., over-the-air) eSIMs can provide convenience for consumers and vendors when configuring a device to access a mobile network operator's wireless network.

While the use of eUICCs and eSIMs can provide the aforementioned benefits of the installation of multiple eSIMs on a single eUICC, as well as remote provisioning of eSIMs, the storage space in eUICCs can be limited such that installation of additional eSIMs can require removing existing eSIMs from the eUICCs in order to establish the required storage space. One existing solution for freeing space on an eUICC to enable installation of an additional eSIM generally involves permanently deleting an eSIM such that the deleted eSIM cannot again be used by the eUICC. Another existing solution involves exporting the eSIM from the secure eUICC environment to a secure environment on a remote provisioning server such that the eSIM is "deprovisioned" from the eUICC and is no longer locally maintained at the wireless communication device.

Notably, the foregoing solutions can be undesirable for a variety of reasons. For example, in some cases, deletion of an eSIM from the eUICC may be non-reversible due to security requirements to prevent eSIM cloning. Consequently, deletion of the eSIM does not allow for a subsequent re-installation of the eSIM on the eUICC as the eSIM no longer exists, and the user must download another eSIM from the network, thereby imposing cost and liability issues. Moreover, in the case of exporting to a remote provisioning server, the user may not always have a network connection to enable exportation of the eSIM to the provisioning server and/or may wish to locally maintain the eSIM at the wireless communication device rather than having the eSIM remotely "deprovisioned."

SUMMARY

Some example embodiments provide methods, apparatuses, and computer program products for secure storage of an eSIM on a wireless communication device. In this regard, some example embodiments enable the secure storage of an eSIM on a memory that is included in the wireless communication device and is external to an eUICC included in the wireless communication device. More particularly, the eUICC of some example embodiments can be configured to maintain a single-use session parameter associated with an encrypted eSIM package stored on wireless communication device memory for later use to support installation of the eSIM. If the eSIM package is later loaded onto the eUICC, the single-use session parameter can be used to validate the eSIM package, and the eSIM contained therein can then be installed on the eUICC. Such embodiments accordingly enable an eSIM to be securely encrypted and stored on wireless communication device memory while ensuring that the eUICC can later validate and install the eSIM.

The foregoing embodiments can be particularly beneficial in situations in which there is insufficient storage space on the eUICC to enable installation of an additional eSIM. For example, some embodiments can be applied to enable secure exportation of an eSIM from an eUICC to local wireless communication device memory while enabling later reinstallation of the eSIM on the eUICC and protecting against cloning or other misuse of the eSIM. As another example, some embodiments can be used to securely store an eSIM on wireless communication device memory during a provisioning session instead of installing the eSIM on the eUICC, e.g., in the event that there is insufficient space for the eSIM on the eUICC. The eSIM can then later be loaded and installed on the eUICC.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some example embodiments provide for secure storage of an eSIM on a wireless communication device memory external to an eUICC implemented on the wireless communication device. More particularly, the eUICC of some example embodiments can be configured to maintain a single-use session parameter, such as a level 2 (L2) challenge and/or other security nonce, associated with an encrypted eSIM package stored on wireless communication device memory for later use to support installation of the eSIM. If the eSIM package is later loaded onto the eUICC, the single-use session parameter can be used to validate the eSIM package, and the eSIM contained therein can then be installed on the eUICC. Such embodiments accordingly enable an eSIM to be securely encrypted and stored on wireless communication device memory while ensuring that the eUICC can later validate and install the eSIM. The embodiments described herein can additionally prevent cloning of an eSIM stored on wireless communication device memory, installation of an eSIM stored on wireless communication device memory on another eUICC, and/or other misuse of the eSIM.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
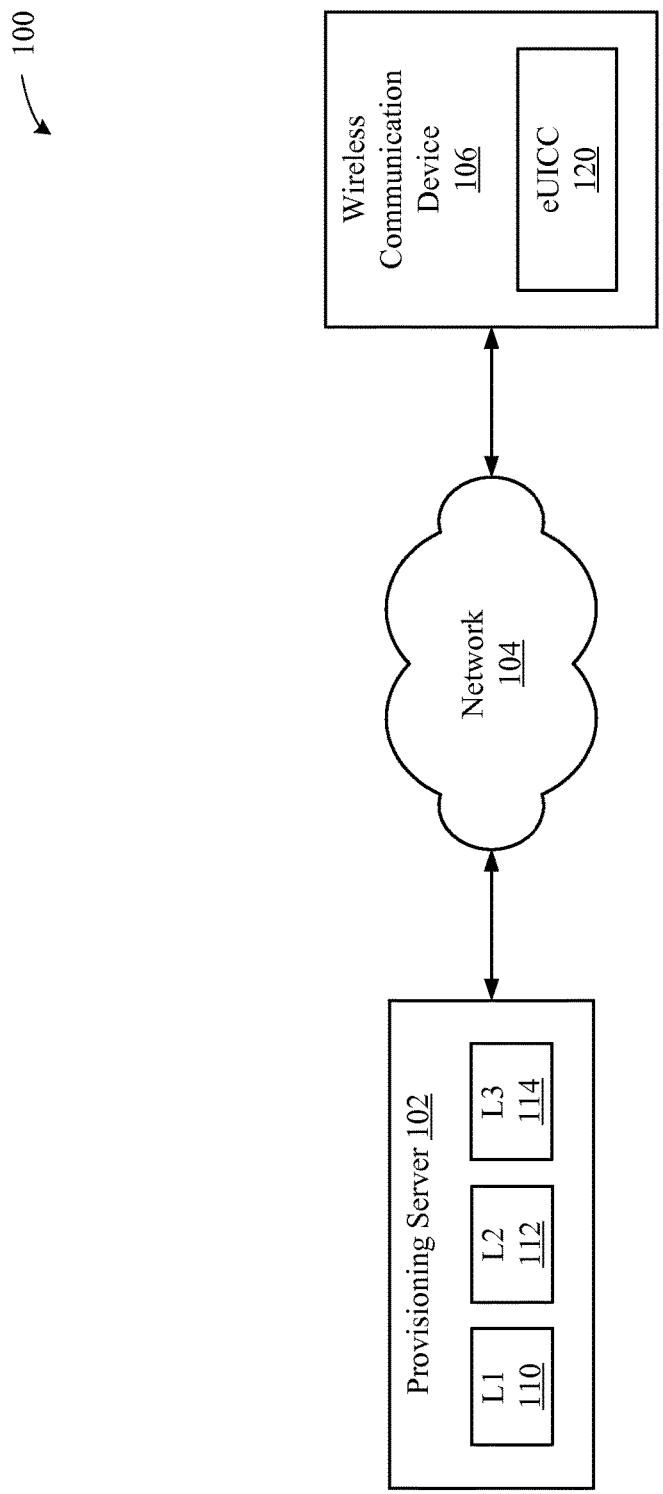
FIG. 1 illustrates an example system for eSIM provisioning in accordance with some example embodiments.

FIG. 1 illustrates an example system 100 for eSIM provisioning in accordance with some example embodiments. The system 100 can include a provisioning server 102 and one or more wireless communication devices 106, which can communicate over a network 104.

The provisioning server 102 can be embodied as one or more computing devices that can be configured to generate and/or provision eSIMs to eUICCs (e.g., eUICC 120) implemented on wireless communication devices 106 in accordance with various example embodiments. The provisioning server 102 can be further tasked with managing and authorizing use of eSIMs within one or more networks. The provisioning server 102 can, for example, comprise one or more physical servers, a cloud computing infrastructure configured to implement functionality of the provisioning server 102 (e.g., a virtual computing system implemented on underlying physical hardware), and/or other server device(s). In embodiments in which functionality of the provisioning server 102 is provided by multiple physical computing devices, the computing devices can be co-located in a common location, or can be distributed across multiple physical locations and can communicate via the network 104. The provisioning server 102 can be hosted/operated by any entity that can maintain, provision, and/or manage a pool of eSIMs, such as by way of non-limiting example, a mobile network operator(s), a device manufacturer, a device vendor, or other such entity.

The network 104 can be embodied as any network or combination of networks configured to support communication between two or more computing devices, such as provisioning server 102 and the wireless communication device 106. By way of non-limiting example, the network 104 can comprise one or more wireline networks, one or more wireless networks (e.g., a cellular network(s), wireless local area network(s), wireless wide area network(s), wireless metropolitan area network(s), some combination thereof, or the like), or a combination thereof, and in some example embodiments can comprise the Internet.

The wireless communication device 106 can be embodied as any computing device that can be configured to access a cellular network. By way of non-limiting example, the wireless communication device 106 can be embodied as a cellular phone, such as a smart phone, a tablet computing device, a digital media player device, a cellular wireless hotspot device, a laptop computer, some combination thereof, or the like. As a further example, the wireless communication device 106 can be embodied as a machine-to-machine (M2M) device, a device that can be embedded within or operatively coupled with a host device to provide network connectivity for the host device, or the like that can be configured (e.g., via a SIM) to access a cellular network.

The wireless communication device 106 can include an eUICC 120, which can also be referred to as a "secure element." In some embodiments, the eUICC 120 can be embedded within (e.g., soldered to) a main system board of the wireless communication device 106. In some example embodiments, the eUICC 120 can comprise a sandboxed hardware/software environment that cannot be directly accessed by external entities, such as a main, or host, operating system (OS) that can be executed on the wireless communication device 106. The eUICC 120 can include processing circuitry, such as a microprocessor, and a storage device that can work together to process commands and carry out various authentication mechanisms that can be used to enable the wireless communication device 106 to access a mobile network operator's network. The storage space of the eUICC 120 can provide storage for installation of one or more eSIMs, such as an eSIM that can be provisioned by the provisioning server 102, on the eUICC 120. The eUICC 120 can be configured to use an eSIM installed on the eUICC 120 to facilitate network authentication for accessing a mobile operator's network.

The wireless communication device 106, and thus an eSIM that can be provisioned by the provisioning server 102 and/or installed on the eUICC 120 can be configured for accessing networks using any of a variety of radio access technologies (RATs). By way of non-limiting example, the wireless communication device 106 and/or an eSIM in accordance with some example embodiments can support a Long Term Evolution (LTE) RAT, such as various releases of the LTE standard specified by the Third Generation Partnership Project (3GPP), including various releases of LTE, LTE-Advanced (LTE-A), and/or other present or future releases using LTE technology. As another example, the wireless communication device 106 and/or an eSIM in accordance with some example embodiments can support a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1×RTT; and/or the like. As a further example, the wireless communication device 106 and/or an eSIM in accordance with some example embodiments can support a second generation (2G) cellular RAT, such as a Global System for Mobile Communications (GSM) RAT. It will be appreciated that the foregoing RATs are provided by way of example, and not by way of limitation. In this regard, the wireless communication device 106 and/or an eSIM in accordance with some example embodiments can be configured to communicate via any present or future developed cellular RAT, including, for example, various fifth generation (5G) RATs now in development.

As described previously, the provisioning server 102 can be configured to provision an eSIM to the eUICC 120 via the network 104. This provisioning can, for example, be accomplished using various over-the-air (OTA) techniques. Additionally or alternatively, in some example embodiments, the wireless communication device 106 can be connected to the network 104 and/or directly to the provisioning server 102 via a wireline connection and an eSIM can be provisioned to the eUICC 120 via the wireline connection.

In some example embodiments, the provisioning server 102 can be additionally or alternatively configured to provide management services for controlling the usage of previously provisioned eSIMs. For example, in some embodiments, the provisioning server 102 can be configured to grant/deny authorization for secure storage of an eSIM on a memory of the wireless communication device 106 (e.g., "off-card" SIM storage) in accordance with various example embodiments. In some such embodiments, the eUICC 120 and/or wireless communication device 106 can be configured send a request to the provisioning server 102 for permission to store an eSIM on a memory of the wireless communication device 106 that is external to the eUICC 120.

In some example embodiments, the provisioning server 102 and eUICC 120 can be configured to implement and/or otherwise support one or more logical security layers that can implement security mechanisms for the provisioning process. For example, the provisioning server 102 of some example embodiments can be configured to implement one or more of a level 1 (L1) entity 110, level 2 (L2) entity 112, or level 3 (L3) entity 114. The eUICC 120 of some example embodiments can locally implement logical security layers and/or processes (e.g., L1, L2, and/or L3) corresponding to the logical security entities of the provisioning server 102. In accordance with some example embodiments, L1 (e.g., the L1 entity 110 and any corresponding L1 layer/process on the eUICC 120) can provide encryption services; L2 (e.g., the L2 entity 112 and any corresponding L2 layer/process on the eUICC 120) can provide anti-cloning services; and L3 (e.g., the L3 entity 114 and any corresponding L3 layer/process on the eUICC 120) can provide authorization services. In some example embodiments, two or more of the L1 entity 110, L2 entity 112, and L3 entity 114 can be implemented as a logical software entity running on a common physical server or set of servers. Alternatively, in some example embodiments, individual logical security entity, such as individual ones of the L1 entity 110, L2 entity 112, and/or L3 entity 114 can be implemented on physical server(s) that is discrete from a server(s) implementing another logical security entity.

Figure 2:
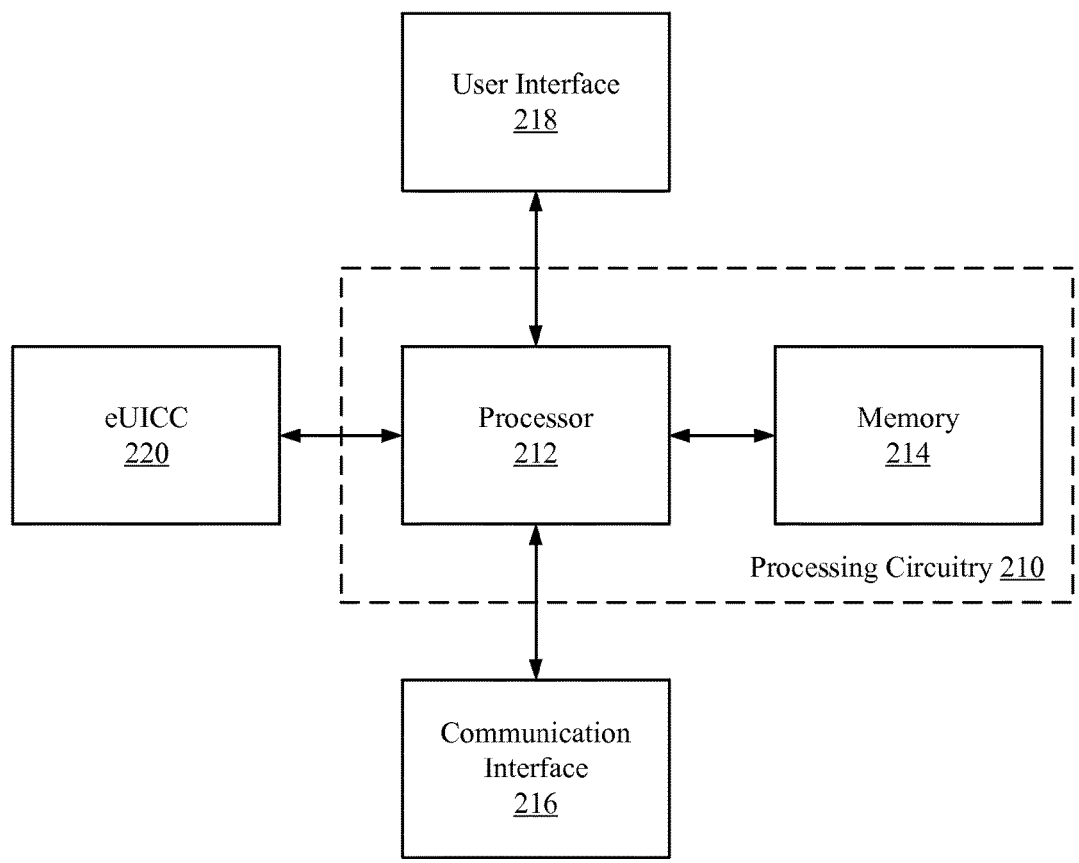
FIG. 2 illustrates a block diagram of an apparatus that can be implemented on a wireless communication device in accordance with some example embodiments.

FIG. 2 illustrates a block diagram of an apparatus 200 that can be implemented on a wireless communication device, such as wireless communication device 106, in accordance with some example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution, and/or other processing and management services according to one or more example embodiments. For example, in some embodiments, the processing circuitry 210 can be configured to support operation of a main host operating system of a wireless communication device.

In some embodiments, the apparatus 200 or a portion(s) or component(s) thereof, such as the processing circuitry 210, can be implemented via one or more integrated circuits, each of which can include one or more chips. The processing circuitry 210 and/or one or more further components of the apparatus 200 can therefore, in some instances, be configured to implement an embodiment on an integrated circuit (e.g., as a "system on a chip"). In some example embodiments, one or more components of the apparatus 200 can be implemented on a chipset capable of enabling a computing device to access a network, such as wireless network 104, when implemented on or otherwise operably coupled to the computing device. In some such example embodiments, the apparatus 200 can include a cellular baseband chipset, which can be configured to enable a computing device, such as wireless communication device 106, to operate on one or more cellular networks.

In some example embodiments, the processing circuitry 210 can include a processor 212 and, in some embodiments, such as that illustrated in FIG. 2, can further include memory 214. The processing circuitry 210 can be in communication with or otherwise control the communication interface 216 and/or user interface 218.

The processor 212 can be embodied in a variety of forms. For example, the processor 212 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the wireless communication device 106 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. The memory 214 can further provide memory for securely storing an eSIM external to the eUICC 220 in accordance with various example embodiments. In some embodiments, the memory 214 can be in communication with one or more of the processor 212, communication interface 216, user interface 218, or eUICC 220 via one or more buses for passing information among components of the apparatus 200.

The apparatus 200 can further include a communication interface 216. The communication interface 216 of some example embodiments can provide a wireless communication interface configured to enable the apparatus 200 to send wireless signals to and receive signals from one or more wireless networks. For example, the communication interface 216 of some example embodiments can be configured to support access to a cellular network by enabling wireless communication with a cellular base station. The communication interface 216 can accordingly include one or more transceivers and supporting hardware and/or software for enabling communication in accordance with one or more cellular RATs. The communication interface 216 of some embodiments can further include one or more transceivers and/or other radio components to support one or more further wireless communication technologies, such as Wi-Fi (e.g., an IEEE 802.11 technology), Bluetooth, and/or other wireless communications technology. In some example embodiments, the communication interface 216 can additionally include a communication modem or other hardware/software for supporting communication via cable, digital subscriber line (DSL), USB, FireWire, Ethernet, one or more optical transmission technologies, and/or other wireline networking methods.

In some example embodiments, the apparatus 200 can include the user interface 218. It will be appreciated, however, that in some example embodiments, one or more aspects of the user interface 218 may be omitted, and in some embodiments, the user interface 218 may be omitted entirely. The user interface 218 can be in communication with the processing circuitry 210 to receive an indication of a user input and/or to provide an audible, visual, mechanical, or other output to a user. As such, the user interface 218 can include, for example, a keyboard, a mouse, a joystick, a display, a touch screen display, a microphone, a speaker, one or more biometric input devices, and/or other input/output mechanisms. In embodiments wherein the user interface 218 comprises a touch screen display, the user interface 218 can additionally be configured to detect and/or receive an indication of a touch and/or other movement gesture or other input to the display.

The user interface 218 can, for example, be configured to display a graphical user interface enabling a user to manage an eSIM(s) stored on the eUICC 220, an eSIM(s) stored on the memory 214, and/or an eSIM that can be provisioned by the provisioning server 102 during a provisioning session. For example, the user interface 218 can display a graphical user interface providing a selectable option(s) to store an eSIM off-card on the memory 214 and/or to install an eSIM stored on the memory 214 to the eUICC 220 in accordance with various embodiments. The user interface 218 can further be configured to provide an input mechanism(s) to enable a user to select an option, such as can be presented on a displayed graphical user interface, to select to store an eSIM off-card on the memory 214, to install an eSIM stored on the memory 214 to the eUICC 220, and/or to otherwise manage an eSIM in accordance with various example embodiments.

The apparatus 200 can further include the eUICC 220, which can, for example, comprise an embodiment of the eUICC 120. The eUICC 220 can accordingly include processing circuitry and a storage device that can be configured to store and manage one or more eSIMs, such as can be provisioned by the provisioning server 102 in accordance with various example embodiments. The eUICC 220 can be configured to maintain a single-use session parameter associated with an eSIM package that can be stored on a wireless communication device memory (e.g., memory 214) external to the eUICC 220 to enable later validation and installation of the eSIM if it is loaded onto the eUICC 220 in accordance with various embodiments.

Figure 3:
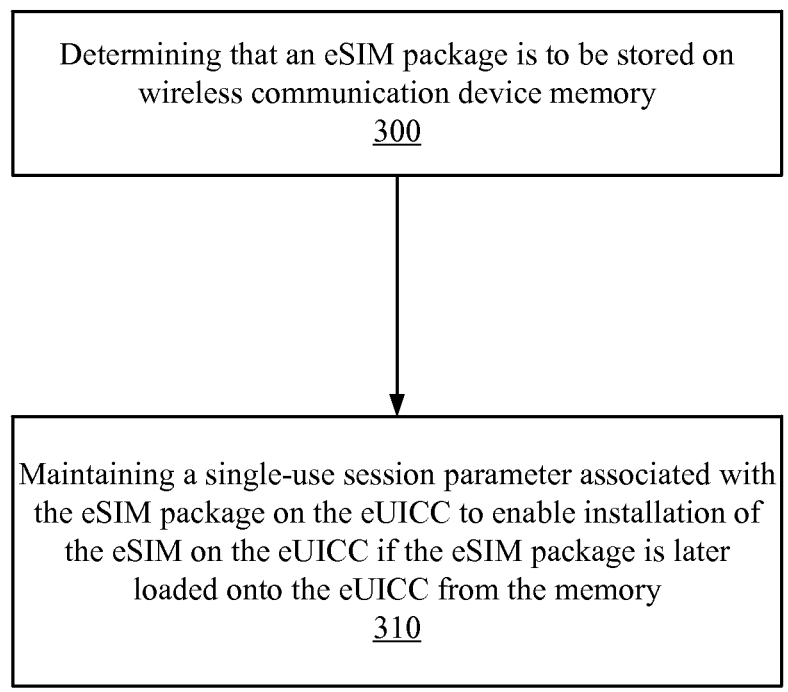
FIG. 3 illustrates a flowchart according to an example method for secure storage of an eSIM on a wireless communication device memory in accordance with some example embodiments.

FIG. 3 illustrates a flowchart according to an example method for secure storage of an eSIM on a wireless communication device memory, such as memory 214, in accordance with some example embodiments. In this regard, FIG. 3 illustrates a method that can be performed by an eUICC, such as eUICC 120 and/or eUICC 220 in accordance with various embodiments.

Operation 300 can include the eUICC determining that an eSIM package including an eSIM is to be stored on wireless communication device memory. The determination can, for example, be based on an instruction received from the wireless communication device, such as in response to a user command that can be input via user interface 218.

In some embodiments, such as that illustrated in and described further herein below with respect to FIG. 4, the determination of operation 300 can include determining that an eSIM stored on the eUICC is to be exported to the wireless communication device memory. For example, an eSIM can be exported from the eUICC to the wireless communication device memory to free storage space on the eUICC for another eSIM.

In some embodiments, such as that illustrated in and described further herein below with respect to FIG. 5, the determination of operation 300 can include determining during a provisioning session (e.g., a provisioning session with the provisioning server 102) that an eSIM being provisioned to the eUICC will be stored on the wireless communication device memory rather than being loaded and installed on the eUICC. For example, there may not be sufficient storage space on the eUICC for the eSIM and the eSIM can be stored on wireless communication device memory rather than discontinuing the provisioning session. In this regard, the eSIM can be temporarily stored on wireless communication device memory and installation of the eSIM can be paused until space is cleared on the eUICC to accommodate the new eSIM. In some such example embodiments, a wireless communication device user can be prompted via a user interface (e.g., user interface 218) that there is insufficient space on the eUICC to install the eSIM, and the user can select to continue the provisioning session and temporarily store the eSIM on device memory.

The method can further include the eUICC performing operation 310 in response to the determination of operation 300. Operation 310 can include the eUICC maintaining a single-use session parameter associated with the eSIM package on the eUICC to enable installation of the eSIM on the eUICC if the eSIM package is later loaded onto the eUICC from the memory. The session parameter can, for example, comprise a security nonce that can be used by an eUICC to validate and/or otherwise authenticate an eSIM package so as to prevent cloning or other misuse of the eSIM. For example, in some embodiments, the session parameter that can be maintained in operation 310 can include an L2 security value, such as a L2 challenge, that can be generated and used for a single eSIM and/or eSIM provisioning session.

In this regard, the session parameter can be maintained for later use rather than being discarded. Accordingly, even if a successor session parameter is generated for an intervening provisioning session or other eSIM operation before the eSIM package is loaded onto the eUICC from the memory, the maintained session parameter can later be used if the eSIM package is loaded onto the eUICC for installation.

In some example embodiments, the eUICC can maintain further session context parameters for an eSIM stored on wireless communication device memory. For example, a session identifier associated with a provisioning session, an eSIM identifier, and/or other identifier that can be used to uniquely identify an eSIM package can be maintained in association with a session parameter such that the eUICC can access and use an appropriate session parameter and/or other session context information for validation and installation if the eSIM package is later loaded onto the eUICC from wireless communication device memory.

The session parameter and/or other session context information that can be maintained by the eUICC can be maintained in non-volatile memory of the eUICC, such as non-volatile random access memory (NVRAM). Accordingly, if there is a power cycle before installation of the eSIM, the eUICC will still have access to the session context information to enable validation and installation of the eSIM.

In embodiments, such as that illustrated in and described further herein below with respect to FIG. 4, in which an eSIM stored on the eUICC is to be exported to the wireless communication device memory, the session parameter that can be maintained in operation 310 can be generated by the eUICC to support the exportation and can be used to prepare the eSIM package for exportation. In embodiments, such as that illustrated in and described further herein below with respect to FIG. 5, in which an eSIM being provisioned to the eUICC will be stored on the wireless communication device memory rather than being loaded and installed on the eUICC, the session parameter that can be maintained in operation 310 can be the session parameter to be used for eSIM validation in the provisioning session.

In some example embodiments, such as that illustrated in and described further herein below with respect to FIG. 5, in which an eSIM being provisioned to the eUICC will be stored on the wireless communication device memory rather than being loaded and installed on the eUICC, the eUICC and/or wireless communication device can provide an indication to the provision server that download of the eSIM was successful after the eSIM is successfully stored locally on wireless communication device memory. In some such embodiments, the message can simply be an "OK" message that can be identical to a message that can be sent in response to successful eSIM installation during a provisioning session. Alternatively, in some such embodiments, the message can specifically indicate that the eSIM has been stored in wireless communication device memory and installation on the eUICC has been deferred until a later time.

Figure 4:
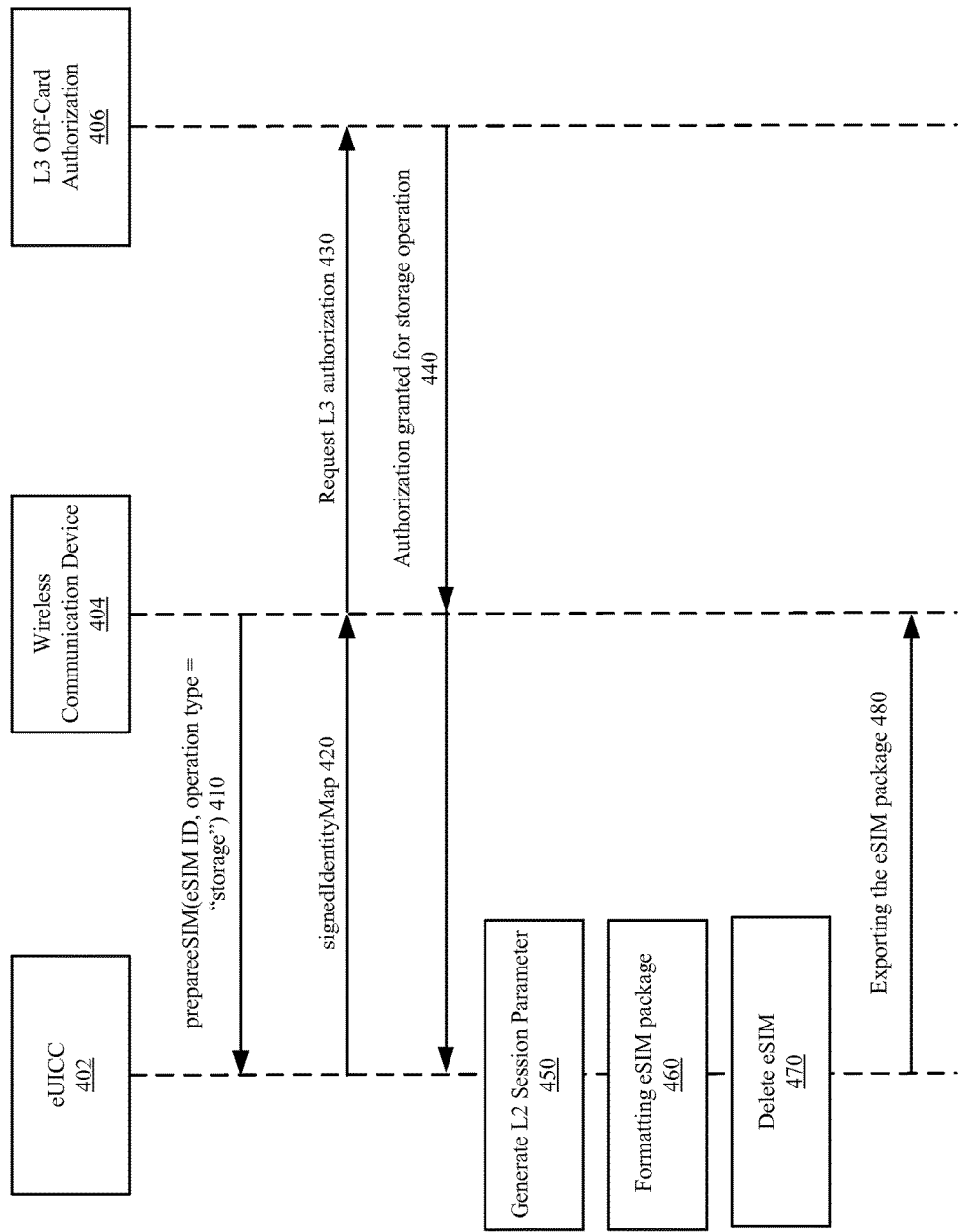
FIG. 4 illustrates a signaling diagram according to an example method for secure exportation of an eSIM from an eUICC to a wireless communication device memory in accordance with some example embodiments.

FIG. 4 illustrates a signaling diagram according to an example method for secure exportation of an eSIM from an eUICC to a wireless communication device memory in accordance with some example embodiments. More particularly, FIG. 4 illustrates signaling that can be exchanged between and operations that can be performed by an eUICC 402, wireless communication device 404, and L3 off-card authorization entity 406 to support secure exportation of an eSIM from an eUICC to a wireless communication device memory in accordance with some example embodiments.

The eUICC 402 can be implemented on the wireless communication device 404. In some embodiments, the eUICC 402 can comprise an embodiment of the eUICC 120 and/or eUICC 220.

The wireless communication device 404 can be an embodiment of wireless communication device 106. An apparatus 200 can be implemented on the wireless communication device 404. As such, one or more of processing circuitry 210, processor 212, memory 214, communication interface 216, or user interface 218 can, for example, provide means for performing the functionality of the wireless communication device 404.

In some example embodiments, the L3 off-card authorization entity 406 can be a network server entity configured to provide L3 security services. For example, in some embodiments, the L3 off-card authorization entity 406 can be an embodiment of the L3 entity 114 and/or other entity of a provisioning server configured to provide L3 security services. Additionally or alternatively, in some example embodiments, aspects of the L3 off-card authorization entity 406 can be provided by user credentials that can be locally stored on memory of the wireless communication device 404 (e.g., on memory 214).

The wireless communication device 404 and/or eUICC 402 can determine that an eSIM stored on the eUICC 402 is to be exported to memory of the wireless communication device 404 (e.g., to memory 214). In this regard, the eSIM can essentially be exported from the eUICC 402 to itself for off-card storage on memory of the wireless communication device 404. This determination can, for example, be made in response to an instruction that can be received from a user of the wireless communication device 404 (e.g., via user interface 218).

With reference to FIG. 4, operation 410 can include the wireless communication device 404 passing an instruction to the eUICC 402 to prepare the eSIM for storage on the memory. For example, the wireless communication device 404 can pass a "prepareeSIM" instruction including parameters identifying the eSIM (e.g., "eSIM ID") and indicating that the operation type is "storage").

Operation 420 can include the eUICC 402 passing a "signedIdentityMap" message to the wireless communication device 404 to enable the obtainment of L3 authorization for off-card storage of the eSIM. The wireless communication device 404 can, in turn, request L3 authorization from the L3 off-card authorization entity 406, at operation 430. Operation 440 can include the L3 off-card authorization entity 406 granting authorization for the storage operation.

Operation 450 can include the eUICC 402 generating a new L2 session parameter, such as an L2 challenge, to support exportation of the eSIM. In this regard, a new L2 session parameter can be generated as the existing current L2 session parameter for the eUICC 402 can be pre-shared with the network for a future eSIM provisioning session. The eUICC 402 can maintain the new L2 session parameter, as the eUICC 402 can know that it will be the future recipient of the eSIM package being prepared for exportation.

Operation 460 can include the eUICC 402 formatting the eSIM package. The eSIM package can include an encrypted copy of the eSIM. The eSIM encryption can, for example, be handled via any appropriate L1 encryption technique that can prevent an entity other than the eUICC 402 from decrypting the eSIM after exportation to the memory of the wireless communication device 404.

For example, in some embodiments the eSIM can be encrypted with a public key of a public-private key pair associated with the eUICC 402. Accordingly, the eSIM can only be decrypted with a private key that can be known only to the eUICC 402 such that, unless the private key of the eUICC 402 is compromised, the eSIM cannot be decrypted by any other entity when exported to the memory of the wireless communication device 404.

As another example, in some embodiments, the eSIM can be encrypted with a symmetric key (e.g., an AES128 key). The symmetric key can be maintained in secret by the eUICC 402 for later use in decrypting the eSIM if the eSIM package is later loaded back onto the eUICC 402 from the memory of the wireless communication device 404. Additionally or alternatively, in some such embodiments, the symmetric key can be encrypted (e.g., with the public key of the eUICC 402) and can be included in the eSIM package for exportation to the memory of the wireless communication device 404. Accordingly, if the eSIM package is later loaded back onto the eUICC 402 from the memory of the wireless communication device 404, the eUICC 402 can use its private key to decrypt the symmetric key and then use the decrypted symmetric key to decrypt the eSIM.

The eSIM package can additionally include a copy of the L2 session parameter generated in operation 450. For example, the eSIM package can be signed with L2 session parameter. IN some example embodiments, the copy of the L2 session parameter that can be included in the eSIM package can be encrypted along with the eSIM to provide additional protection against misuse, such as in embodiments in which the eUICC 402 does not differentiate all on-card challenges.

After the eSIM package has been prepared, the eUICC 402 can delete the existing eSIM on the eUICC 402 to prevent cloning, as illustrated by operation 470.

Operation 480 can include exporting the eSIM package to the wireless communication device 404. After operation 480, the eSIM (e.g., any copy of the eSIM and/or package containing the eSIM) can be entirely removed from the eUICC 402. The eSIM package can then be maintained in memory of the wireless communication device 404 (e.g., memory 214), from which the eSIM package can later be loaded back to the eUICC 402, such as illustrated in and described further herein below with respect to FIGS. 6-7.

In some embodiments, the eUICC 402 can maintain a flag or other marker for the deleted eSIM that has been exported to the memory of the wireless communication device 404, which can indicate that the eSIM has been stored off-card. This flag can be used to facilitate eSIM management, such as to provide an indication to a user via a user interface that the eSIM exists and has been stored on the memory of the wireless communication device 404 external to the eUICC 402 and enable the user to select to reinstall the eSIM on the eUICC 402.

Figure 5:
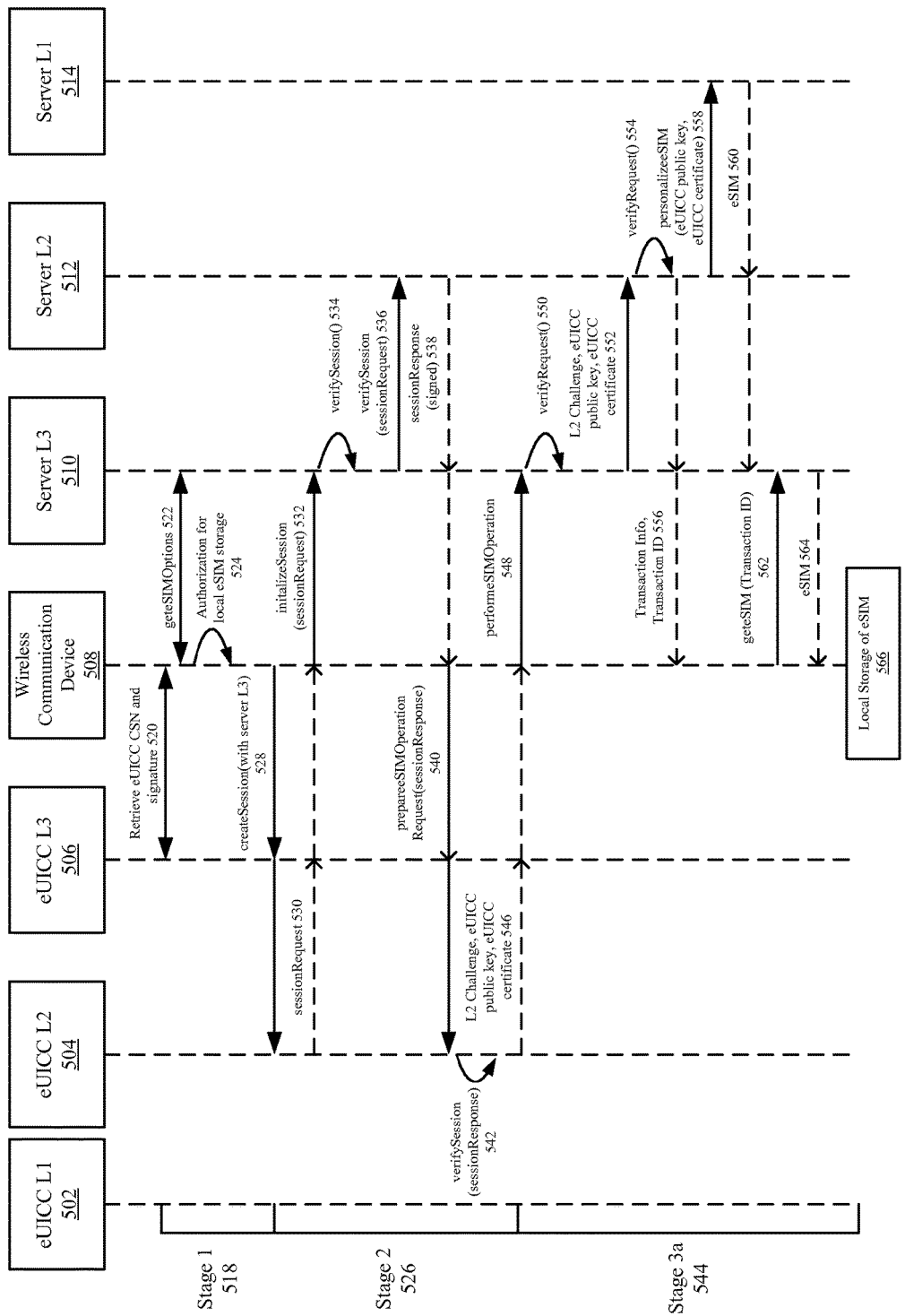
FIG. 5 illustrates a signaling diagram according to an example method for securely storing an eSIM on wireless communication device memory during a provisioning session in accordance with some example embodiments.

FIG. 5 illustrates a signaling diagram according to an example method for securely storing an eSIM on wireless communication device memory during a provisioning session in accordance with some example embodiments. More particularly, FIG. 5 illustrates signaling that can be exchanged between and operations that can be performed by an eUICC, wireless communication device 508, and a provisioning server to support secure storage of an eSIM on a memory of the wireless communication device 508 during a provisioning session.

The eUICC can be implemented on the wireless communication device 508 and can, for example, correspond to an embodiment of eUICC 120 and/or eUICC 220. The eUICC can implement multiple logical security layers, including eUICC L1 502, which can provide encryption services; eUICC L2 504, which can provide anti-cloning services; and eUICC L3 506, which can provide authorization services.

The wireless communication device 508 can be an embodiment of wireless communication device 106. An apparatus 200 can be implemented on the wireless communication device 508. As such, one or more of processing circuitry 210, processor 212, memory 214, communication interface 216, or user interface 218 can, for example, provide means for performing the functionality of the wireless communication device 508.

The provisioning serve can, for example, comprise an embodiment of the provisioning server 102 and can include a plurality of logical security entities, including server L3 510, server L2 512, and server L1 514. The server L3 510 can, for example, correspond to an embodiment of the L3 entity 114, and can provide authorization services. The server L2 512 can, for example, correspond to an embodiment of the L2 entity 112, and can provide anti-cloning services. The server L1 514 can, for example, correspond to an embodiment of the L1 entity 110, and can provide encryption services.

Stage 1 518 of the provisioning session can include the wireless communication device 508 querying available eSIM operations, as illustrated in and described with respect to operations 520 and 522. At operation 520, the wireless communication device 508 can retrieve the eUICC CSN and signature from the eUICC L3 506. The wireless communication device 508 can then communicate with server L3 510 to get the available eSIM options (e.g., via a "geteSIMOptions" message) for the eUICC.

Loading and installation of the eSIM on the eUICC may not be able to proceed due to a storage limitation. However, the user may desire to continue the eSIM download but leave the installation for later if permitted (e.g., by the provisioning server). Operation 524 can include the wireless communication device 508 getting authorization for local eSIM storage. Obtainment of this authorization can include communicating with the server L3 510 (e.g., in operation 522) and/or receiving a user selection to download and locally store the eSIM via a user interface (e.g., user interface 218)

of the wireless communication device 508. It will be appreciated, however, that the illustrated timing of operation 524 is non-limiting, and operation 524 can occur at other points within the provisioning session prior to local storage of the eSIM in accordance with various embodiments.

Stage 2 526 of the provisioning session can include operations 528-542, which can relate to authentication steps for the provisioning session. Operation 528 can include the wireless communication device 508 passing an instruction to the eUICC L3 506 to create a session with the server L3 510. The eUICC L3 506 can perform an L3 verification of the instruction before passing onto the eUICC L2 504.

As illustrated by operation 530, the eUICC L2 504 can generate a session request that can be passed via the eUICC L3 506 to the wireless communication device 508. Operation 532 can include the wireless communication device 508 sending a session initialization request message, which can include the session request generated by the eUICC L2 504 as a parameter, to the server L3 510.

The server L3 510 can perform L3 verification of the request and, provided the request is verified, can pass a verifySession message, which can include the session request generated by the eUICC L2 504 as a parameter, to the server L2 512. The server L2 512 can perform L2 verification of the session request, and can generate a signed session response (sessionResponse), at operation 538, which can be sent to the wireless communication device 508 via the server L3 510.

The wireless communication device 508 can pass an instruction (prepareeSIMOperationRequest), which can include the session response from the server L2 512, to the eUICC, at operation 540. The eUICC L2 504 can verify the session response, at operation 542.

Provided that the session response is appropriately verified, Stage 3a 544, which can include operations 546-566 of the provisioning session can begin. Stage 3a 544 can include eSIM transport operations for the provisioning session.

Operation 546 can include the eUICC L2 504 passing parameters, such as the L2 challenge for the session, the eUICC public key, and the eUICC certificate, for eSIM provisioning to the wireless communication device 508. The wireless communication device 508 can, in turn, send those parameters to the server L3 510 (e.g., in a "performeSIMOperation" message) in operation 548.

The server L3 510 can verify the request from the wireless communication device 508, at operation 550. Provided that the request is verified, the server L3 510 can pass the eUICC parameters (e.g., the L2 challenge, eUICC public key, and eUICC certificate) to the server L2 512, at operation 552. The server L2 512 can, in turn, perform an L2 verification of the request, at operation 554.

Operation 556 can include the server L2 512 sending transaction information including the transaction ID for the provisioning session to the wireless communication device 508. The server L2 512 can additionally send a personalizeeSIM command including the eUICC parameters (e.g., the L2 challenge, eUICC public key, and eUICC certificate) to the server L1 514, at operation 558. The server L1 514 can prepare an eSIM package including an encrypted eSIM (e.g., with the eUICC public key) and can send the eSIM package to the server L2 512, at operation 560. The server L2 512 can sign the eSIM package and can provide the eSIM package to the server L3 510.

The wireless communication device 508 can request the server L3 510 to send the eSIM package via a "geteSIM" message referencing the previously provided transaction ID, at operation 562. Operation 564 can include the server L3 510 sending the eSIM package to the wireless communication device 508. Operation 566 can include the wireless communication device 508 locally storing the eSIM package 566 on a memory external to the eUICC.

In some example embodiments, the eUICC and/or wireless communication device 508 can provide the provisioning server (e.g., the server L3 510) with confirmation that the eSIM was successfully downloaded and stored.

Stage 3b can include loading the eSIM package on the eUICC and installation of the eSIM on the eUICC. The loading and installation can be deferred until a later time, such as after sufficient storage space on the eUICC has been freed. The loading and installation can, for example, be performed in accordance with the techniques illustrated in and discussed below with respect to FIGS. 6 and 7.

Figure 6:
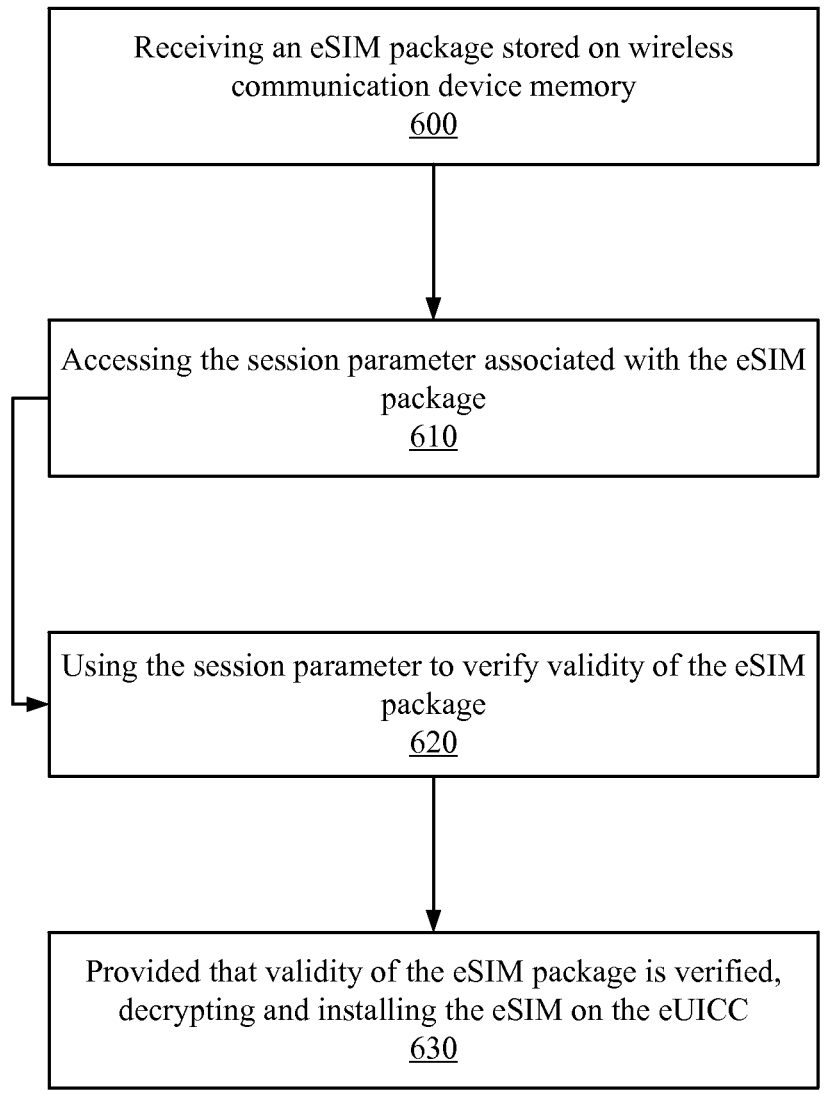
FIG. 6 illustrates a flowchart according to an example method for installing an eSIM stored on wireless communication device memory on an eUICC in accordance with some example embodiments.

FIG. 6 illustrates a flowchart according to an example method for installing an eSIM stored on wireless communication device memory on an eUICC, such as eUICC 120 and/or eUICC 220, in accordance with some example embodiments. In this regard, FIG. 6 illustrates operations that can be performed by the eUICC to install an eSIM securely stored on wireless communication device memory (e.g., memory 214), such as in accordance with the methods discussed with respect to FIGS. 3-5. The method of FIG. 6 can, for example, be performed in response to initialization of installation by the wireless communication device 106 and/or user thereof (e.g., via user interface 218).

Operation 600 can include the eUICC receiving an eSIM package stored on wireless communication device memory. The eUICC can access the stored session parameter associated with the eSIM package, at operation 610. The stored session parameter can be a single-use session parameter, such as an L2 challenge and/or other L2 security value, as described above that can be used to validate the eSIM package and provide anti-cloning protection. In some example embodiments, the eUICC can uses a session ID and/or an eSIM ID that can be included on the eSIM package and/or otherwise passed to the eUICC by the wireless communication device 106 to access the appropriate session parameter for the eSIM package.

Operation 620 can include the eUICC using the session parameter to verify validity of the eSIM package. In some embodiments, the eUICC can delete the session parameter after verifying validity of the eSIM package. Provided that validity of the eSIM package is verified, operation 630 can include the eUICC decrypting and installing the eSIM contained in the eSIM package on the eUICC.

The eSIM package can be deleted from wireless communication device memory attendant to performance of the method of FIG. 6. In this regard, deletion form wireless communication device memory can ensure that there is only one copy of the eSIM in existence at a given time.

In some embodiments, the wireless communication device 106 and/or eUICC 120 can be configured to notify the provisioning server 102 that the eSIM has been installed on the eUICC 120 attendant to performance of the method of FIG. 6 by the eUICC 120.

Figure 7:
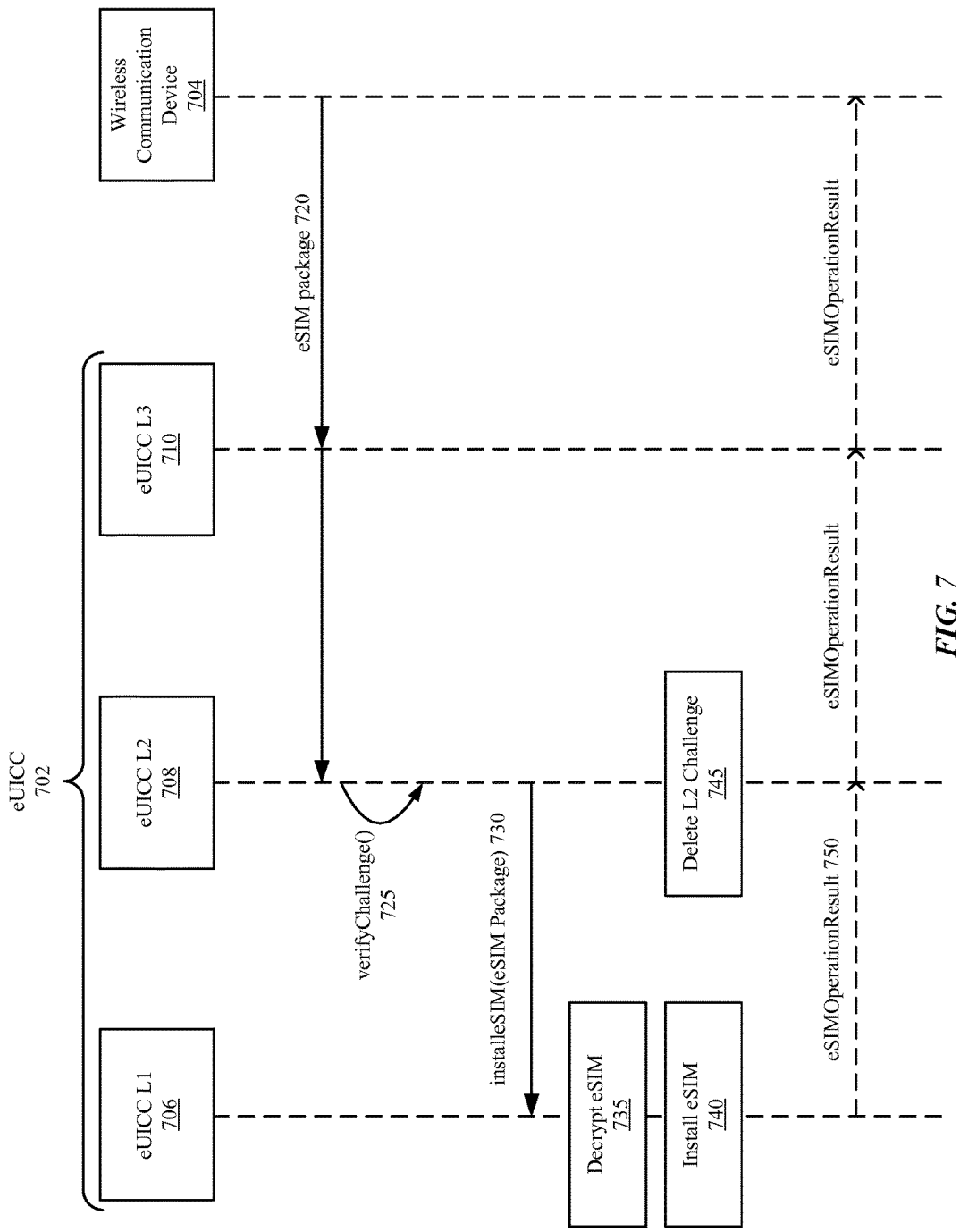
FIG. 7 illustrates a signaling diagram according to an example method for installing an eSIM stored on wireless communication device memory on an eUICC in accordance with some example embodiments.

FIG. 7 illustrates a signaling diagram according to an example method for installing an eSIM stored on wireless communication device memory on an eUICC in accordance with some example embodiments. More particularly, FIG. 7 illustrates signaling that can be exchanged between and operations that can be performed by an eUICC 702 and wireless communication device 704 for installing an eSIM stored on a memory of the wireless communication device, such as in accordance with various techniques discussed with respect to FIGS. 3-5.

The eUICC 702 can be implemented on the wireless communication device 704. In some embodiments, the eUICC 702 can comprise an embodiment of the eUICC 120 and/or eUICC 220. The eUICC 702 can implement multiple logical security layers, including eUICC L1 706, which can provide encryption services; eUICC L2 708, which can provide anti-cloning services; and eUICC L3 710, which can provide authorization services.

The wireless communication device 704 can be an embodiment of wireless communication device 106. An apparatus 200 can be implemented on the wireless communication device 704. As such, one or more of processing circuitry 210, processor 212, memory 214, communication interface 216, or user interface 218 can, for example, provide means for performing the functionality of the wireless communication device 704. The wireless communication device 704 can have an eSIM package locally stored on device memory (e.g., memory 214).

Operation 720 can include the wireless communication device 704 passing the eSIM package to the eUICC 702. The wireless communication device 704 can additionally pas transaction information, such as a transaction ID that can be used by the eUICC 702 to retrieve the appropriate session context for validating the eSIM package. Operation 720 can, for example be performed in response to an instruction from a user of the wireless communication device 704 to install the eSIM.

The eUICC 702 can receive the eSIM package. The eUICC L2 708 can access a stored L2 challenge for eSIM package and use the stored L2 challenge to verify validity of the eSIM package, such as described above with respect to operations 600-620 of FIG. 6.

Provided that the L2 challenge and/or any other transaction information that can be verified for security purposes is validated, the eUICC L2 708 can provide the eSIM package to the eUICC L1 and authorize installation of the eSIM, at operation 730.

Operation 735 can include the eUICC L1 706 decrypting the eSIM included in the eSIM package. Decryption of the eSIM can, for example, be performed with a private key of the eUICC in embodiments in which the eSIM is encrypted with the public key of the eUICC. Alternatively, as another example, the eSIM can be decrypted with a symmetric key that may have been used to encrypt the eSIM.

Operation 740 can include the eUICC L1 706 installing the eSIM on the eUICC 702. The eUICC 708 can additionally delete the L2 challenge, at operation 745, since the single-use parameter is no longer needed or valid for purposes of validating an eSIM package.

Operation 750 can include the eUICC 702 informing the wireless communication device 704 that the eSIM was successfully installed on the eUICC 702. In some example embodiments, the wireless communication device 704 can pass this indication to the provisioning server (e.g., the provisioning server 102) to indicate that the eSIM has been installed and activated.

It will be appreciated that while various embodiments have been described in the context of eUICCs, the techniques described herein can be applied mutatis mutandis to other forms of UICCs, such as traditional SIM cards on which eSIMs can be installed. Further, the techniques described herein have been described with respect to eSIMs, also known as telecom profiles, which can be used to provide authentication for accessing mobile network services. It will be appreciated that the techniques described herein can be applied mutatis mutandis to other types of profiles, such as profiles for transit services, profiles for banking services, and/or the like, that can be stored on an eUICC and/or other secure element.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for exporting and securely storing an embedded Subscriber Identity Module (eSIM) in a wireless communication device that includes (i) an embedded Universal Integrated Circuit Card (eUICC), and (ii) a memory external to the eUICC, the method comprising:

by the eUICC:
  determining to export the eSIM from the eUICC and to store securely the eSIM on the memory external to the eUICC;
  generating a single-use session parameter to support exportation of the eSIM;
  encrypting the eSIM with a key associated with the eUICC;
  formatting an eSIM package to include (i) the eSIM encrypted with the key, and (ii) the single-use session parameter;
  exporting the eSIM package from the eUICC to the memory external to the eUICC; and
  deleting the eSIM from the eUICC,
    wherein the eUICC maintains the single-use session parameter to enable re-installation of the eSIM on the eUICC when the eSIM package is loaded back onto the eUICC from the memory external to the eUICC.

2. The method of claim 1, wherein the single-use session parameter comprises a level 2 (L2) security value.

3. The method of claim 1, further comprising:
by the eUICC:
receiving the eSIM package from the memory external to the eUICC;
using the single-use session parameter to verify a validity of the eSIM package; and
when the validity of the eSIM package is verified:
  installing the eSIM on the eUICC.

4. The method of claim 3, further comprising:
by the eUICC:
  deleting the single-use session parameter from the eUICC after verifying the validity of the eSIM package.

5. The method of claim 3, further comprising:
by the eUICC:
  causing the eSIM package to be deleted from the memory external to the eUICC.

6. The method of claim 1, wherein the eUICC determines to export and store securely the eSIM during an eSIM provisioning session between the eUICC and a provisioning server.

7. The method of claim 6, wherein the eUICC determines to export and store securely the eSIM in response to a lack of sufficient storage space on the eUICC.

8. A wireless communication device, comprising:
an embedded Universal Integrated Circuit Card (eUICC); and
a memory external to the eUICC, wherein the eUICC is configured to carry out steps that include:
  determining to export an embedded Subscriber Identity Module (eSIM) from the eUICC and to store securely the eSIM on the memory external to the eUICC;
  generating a single-use session parameter to support exportation of the eSIM;
  encrypting the eSIM with a key associated with the eUICC;
  formatting an eSIM package to include (i) the eSIM encrypted with the key, and (ii) the single-use session parameter;
  exporting the eSIM package from the eUICC to the memory external to the eUICC; and
  deleting the eSIM from the eUICC,
    wherein the eUICC maintains the single-use session parameter to enable re-installation of the eSIM on the eUICC when the eSIM package is loaded back onto the eUICC from the memory external to the eUICC.

9. The wireless communications device of claim 8, wherein the single-use session parameter comprises a level 2 (L2) security value.

10. The wireless communications device of claim 8, wherein the steps further include:
receiving the eSIM package from the memory external to the eUICC;
using the single-use session parameter to verify a validity of the eSIM package; and
when the validity of the eSIM package is verified:
  installing the eSIM on the eUICC.

11. The wireless communications device of claim 10, wherein the steps further include:
deleting the single-use session parameter from the eUICC after verifying the validity of the eSIM package.

12. The wireless communications device of claim 10, wherein the steps further include:
causing the eSIM package to be deleted from the memory external to the eUICC.

13. The wireless communications device of claim 8, wherein the eUICC determines to export and store securely the eSIM during an eSIM provisioning session between the eUICC and a provisioning server.

14. The wireless communications device of claim 13, wherein the eUICC determines to export and store securely the eSIM in response to a lack of sufficient storage space on the eUICC.

15. A non-transitory computer readable storage medium configured to store instructions that, when executed by an embedded Universal Integrated Circuit Card (eUICC) included in a wireless communication device, cause the eUICC to carry out steps that include:
  determining to export an embedded Subscriber Identity Module (eSIM) from the eUICC and to store securely the eSIM on the memory external to the eUICC;
  generating a single-use session parameter to support exportation of the eSIM;
  encrypting the eSIM with a key associated with the eUICC;
  formatting an eSIM package to include (i) the eSIM encrypted with the key, and (ii) the single-use session parameter;
  exporting the eSIM package from the eUICC to the memory external to the eUICC; and
  deleting the eSIM from the eUICC,
    wherein the eUICC maintains the single-use session parameter to enable re-installation of the eSIM on the eUICC when the eSIM package is loaded back onto the eUICC from the memory external to the eUICC.

16. The non-transitory computer readable storage medium of claim 15, wherein the single-use session parameter comprises a level 2 (L2) security value.

17. The non-transitory computer readable storage medium of claim 15, wherein the steps further include:
receiving the eSIM package from the memory external to the eUICC;
using the single-use session parameter to verify a validity of the eSIM package; and
when the validity of the eSIM package is verified:
  installing the eSIM on the eUICC.

18. The non-transitory computer readable storage medium of claim 17, wherein the steps further include:
deleting the single-use session parameter from the eUICC after verifying the validity of the eSIM package.

19. The non-transitory computer readable storage medium of claim 17, wherein the steps further include:
  causing the eSIM package to be deleted from the memory external to the eUICC.

20. The non-transitory computer readable storage medium of claim 15, wherein the eUICC determines to export and store securely the eSIM in response to a lack of sufficient storage space on the eUICC.

* * * * *